(12) United States Patent
Walter

(10) Patent No.: US 12,467,779 B2
(45) Date of Patent: Nov. 11, 2025

(54) MAGNETIZED WEIGHT AND DISTANCE MEASURING ASSEMBLY AND METHOD

(71) Applicant: John Walter, Chariton, IA (US)

(72) Inventor: John Walter, Chariton, IA (US)

(*) Notice: Subject to any disclaimer, the term of this patent is extended or adjusted under 35 U.S.C. 154(b) by 336 days.

(21) Appl. No.: 18/206,926

(22) Filed: Jun. 7, 2023

(65) Prior Publication Data

US 2024/0410739 A1  Dec. 12, 2024

(51) Int. Cl.
*G01G 7/00* (2006.01)

(52) U.S. Cl.
CPC .................... *G01G 7/00* (2013.01)

(58) Field of Classification Search
CPC ........................................... G01G 7/00
USPC .............................................. 177/1
See application file for complete search history.

(56) References Cited

U.S. PATENT DOCUMENTS

| | | | |
|---|---|---|---|
| 3,629,957 A | 12/1971 | Somashekar | |
| 3,924,261 A * | 12/1975 | Kardashian | G01R 33/045 73/654 |
| 5,810,602 A | 9/1998 | Menelly | |
| 6,307,285 B1 * | 10/2001 | Delson | H02K 23/00 341/20 |
| 6,443,736 B1 | 9/2002 | Lally | |
| 6,582,234 B1 | 6/2003 | Montgomery | |
| 7,780,579 B2 * | 8/2010 | Mueller | G01G 7/04 482/57 |
| 8,174,347 B2 * | 5/2012 | Fullerton | G06F 1/1679 335/306 |
| 8,947,185 B2 * | 2/2015 | Fullerton | H01F 7/20 335/306 |
| 10,565,899 B1 | 2/2020 | Dignam | |
| 2020/0204090 A1 | 6/2020 | Dabney | |

FOREIGN PATENT DOCUMENTS

GB  190700817  10/1907

\* cited by examiner

*Primary Examiner* — Jacques M Saint Surin

(57) ABSTRACT

A magnetized weight and distance measuring assembly and method for demonstrating the inverse square law of magnetism by displaying a change in distance between magnets after applying a weighted member to one of the magnets includes a base and a base magnet mounted the base. A shaft is coupled to the base, and a shaft magnet is mounted to the shaft and is moveable along the shaft when the shaft magnet repels away from the base magnet by a magnetic force. A tube is attached to the shaft magnet to define a receptacle. The receptacle receives a plurality of weighted members, wherein the magnetic force opposes a gravitational force of the receptacle and weighted members such that the receptacle moves upwardly along the shaft when the receptacle receives the weighted members. A plurality of graduation markings is positioned on a panel extending upwardly from said top surface of the base.

8 Claims, 5 Drawing Sheets

MAGNETIZED WEIGHT AND DISTANCE MEASURING ASSEMBLY AND METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to educational assemblies and more particularly pertains to a new educational assembly for demonstrating the inverse square law of magnetism by displaying a change in distance between magnets after applying a weighted member to one of the magnets.

(2) Description of Related Art Including Information Disclosed Under 37 CFR 1.97 and 1.98

The prior art relates to educational assemblies and includes a variety of educational assemblies demonstrating natural laws founds in science. Known prior art does not include an educational assembly demonstrating the inverse square law of magnetism by repelling a pair of magnets from each other when adding weighted members to one of the magnets such that the magnetic force opposes the gravitational force from the weighted magnet.

BRIEF SUMMARY OF THE INVENTION

An embodiment of the disclosure meets the needs presented above by generally comprising a base. A base magnet is mounted to a top surface the base. A shaft has a free end and a base end coupled to the top surface of the base. A shaft magnet is mounted to the shaft and is moveable along the shaft and is configured to repel away from the base magnet by a magnetic force. A tube is coupled to and extending upwardly from the shaft magnet such that the tube and the shaft magnet define a receptacle. The receptacle removably receives a plurality of weighted members, wherein the magnetic force opposes a gravitational force of the receptacle and weighted members such that the receptacle is configured to move upwardly along the shaft when the receptacle receives the weighted members. A plurality of graduation markings is positioned on a panel extending upwardly from said top surface of the base.

Another embodiment of the disclosure comprises a method including the steps of measuring an initial mass of a shaft magnet. The shaft magnet has a tube coupled thereto to define a receptacle. The shaft magnet mounts to a shaft extending upwardly from a base. A base magnet is mounted to the base, wherein the base magnet is configured to repel the shaft magnet by a magnetic force. An initial distance between the shaft magnet and the base magnet is recorded. A weighted mass of a portion of a plurality of weighted members is measured prior to inserting the portion of the weighted members to the receptacle such that the weighted members are configured to move the shaft magnet upwardly along a center longitudinal axis of the shaft. A varied distance between the base magnet and the shaft magnet having the portion of the weighted members is recorded thereafter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
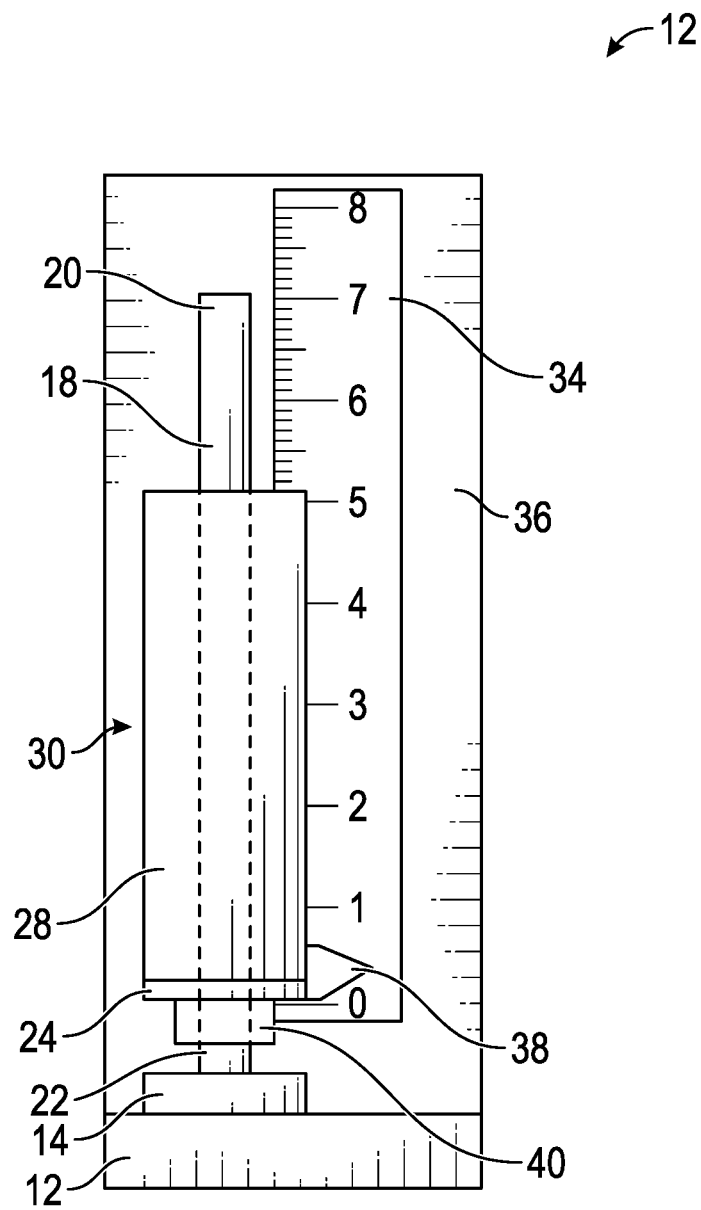
FIG. 1 is a front view of a magnetized weight and distance measuring assembly and method according to an embodiment of the disclosure.
Figure 2:
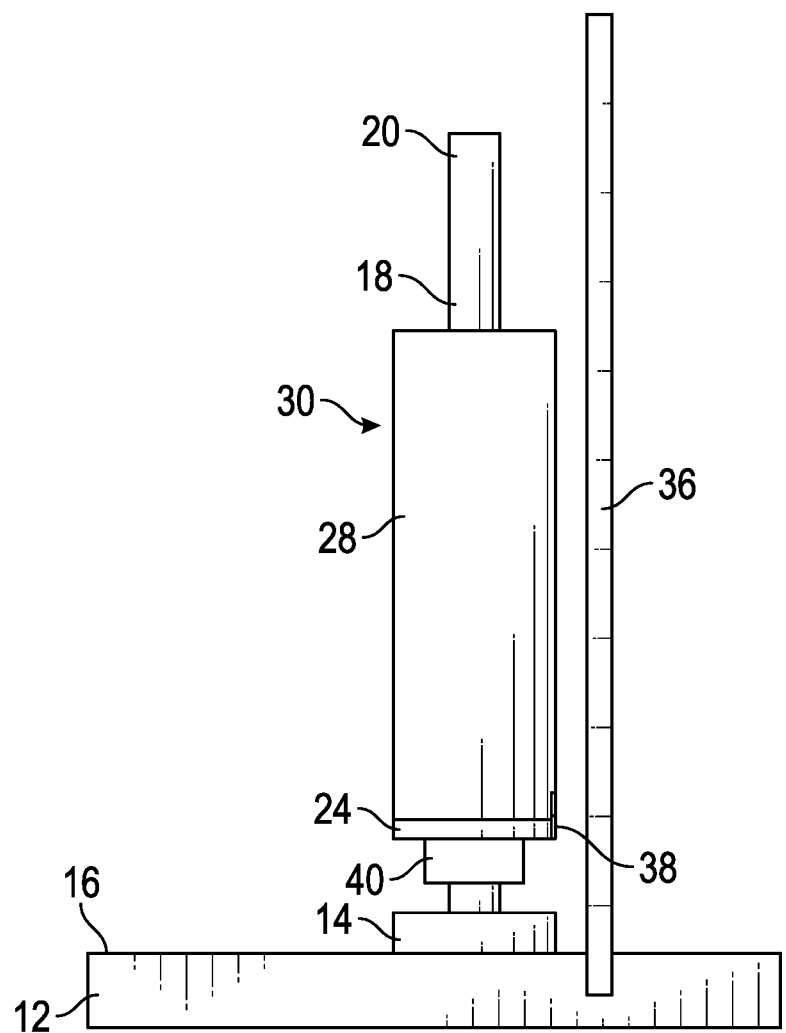
FIG. 2 is a side view of an embodiment of the disclosure.
Figure 3:
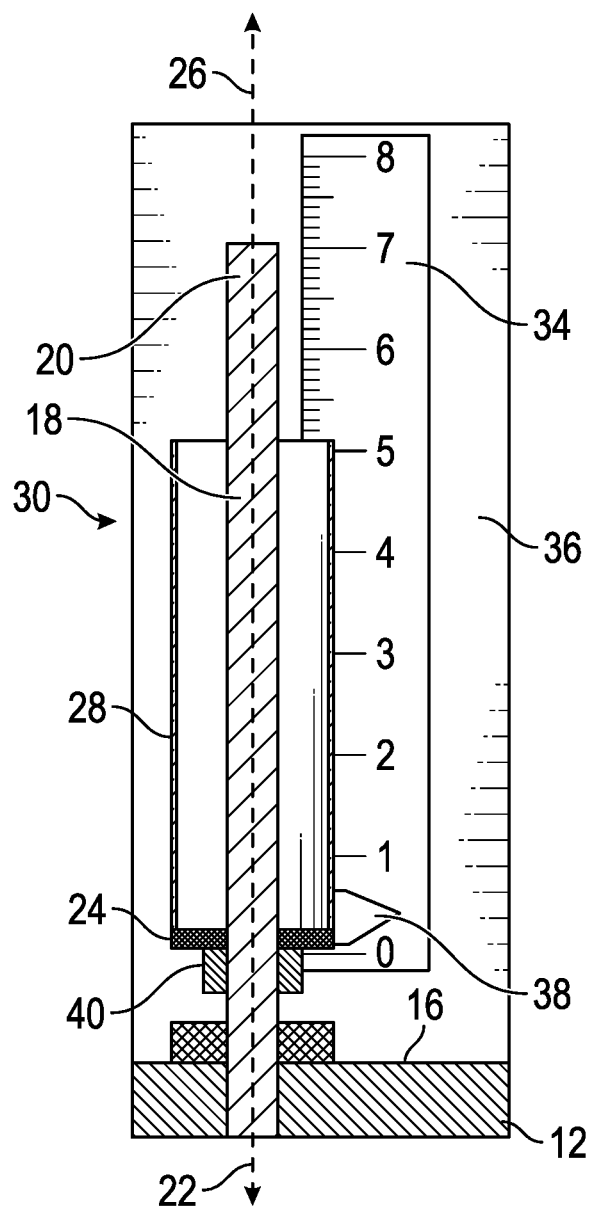
FIG. 3 is a cross-sectional view of an embodiment of the disclosure taken along Line 3-3 of FIG. 2.
Figure 4:
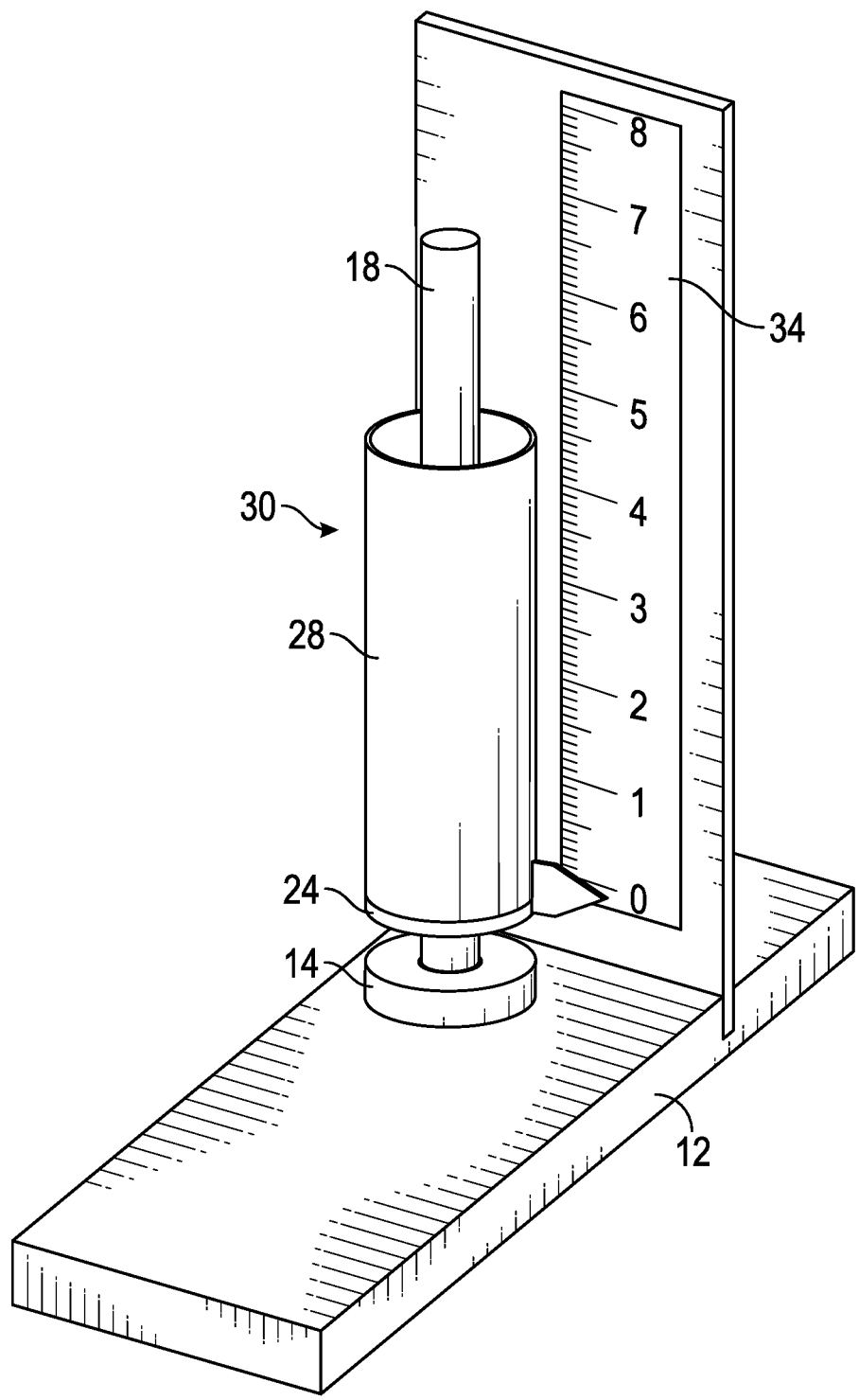
FIG. 4 is a top isometric view of an embodiment of the disclosure.
Figure 5:
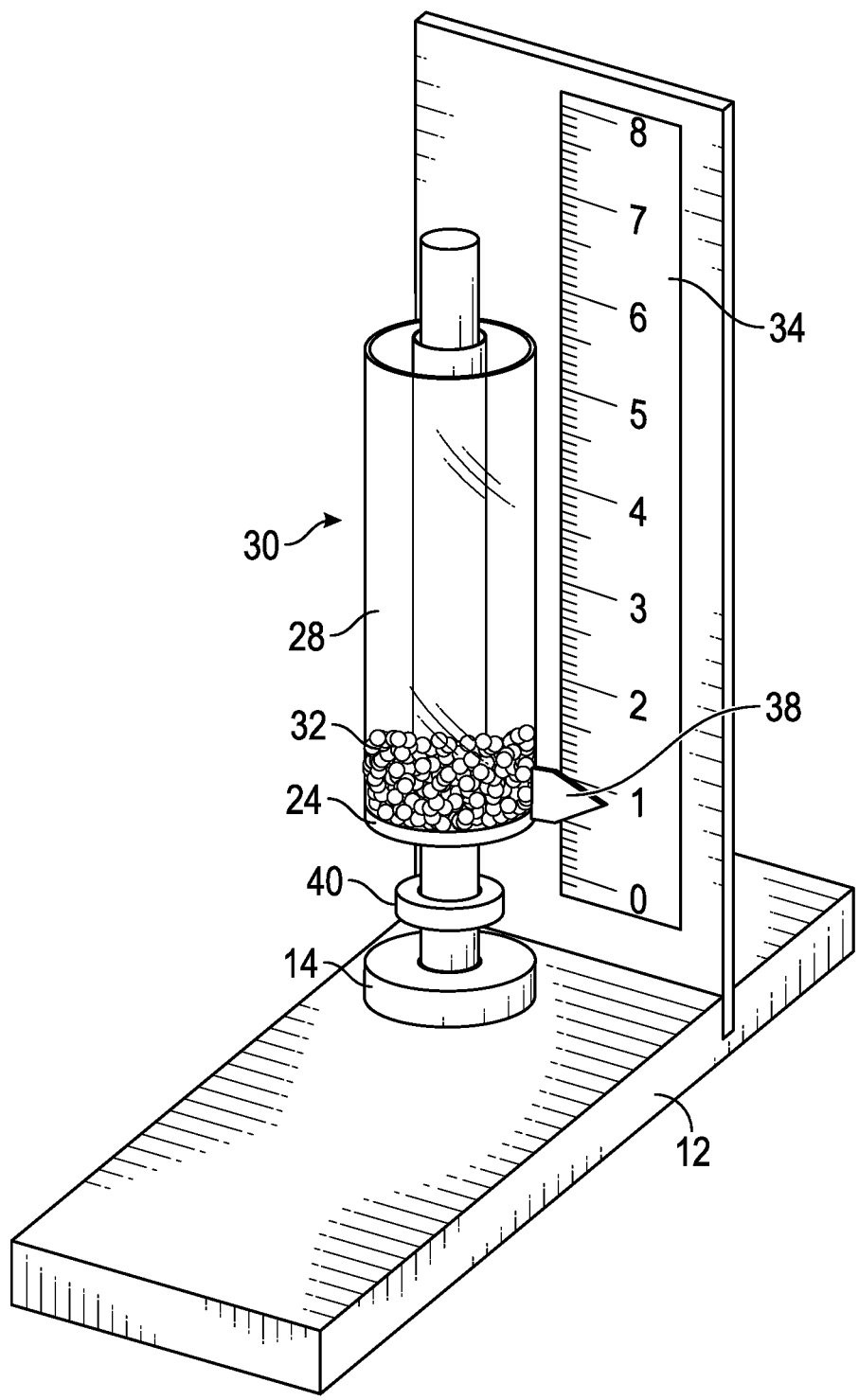
FIG. 5 is a top isometric in-use view of an embodiment of the disclosure.

With reference now to the drawings, and in particular to FIGS. 1 through 5 thereof, a new educational assembly embodying the principles and concepts of an embodiment of the disclosure and generally designated by the reference numeral 10 will be described.

As best illustrated in FIGS. 1 through 5, the magnetized weight and distance measuring assembly and method 10 generally comprises a base 12. The base 12 typically is rectangular-shaped or square-shaped. The base 12 may be weighted to anchor to a surface. Alternatively, an adhesive member may be attached to a bottom surface of the base 12 to adhere the base to the surface. A base magnet 14 is mounted to a top surface 16 the base 12. A shaft 18 has a free end 20 and a base end 22 coupled to the top surface 16 of the base 12. The base end 22 is positioned in and extending upwardly from a hole in the base magnet 14. The base magnet 14 normally is ring shaped, wherein the base magnet 14 is positioned about an outer surface of the shaft 18.

A shaft magnet 24 is mounted to the shaft 18 and is moveable along a center longitudinal axis 26 of the shaft 18. The shaft magnet 24 is configured to repel away from the base magnet 14 by a magnetic force. The shaft magnet 24 is disc-shaped such that the shaft 18 is positioned within an aperture of the shaft magnet 24. Alternatively, the shaft magnet 24 may be square-shaped, star-shaped, or any other geometric shape. A tube 28 is coupled to and extending upwardly from the shaft magnet 24 such that the tube 28 and the shaft magnet 24 define a receptacle 30. The tube 28 has a central longitudinal axis aligned with the center longitudinal axis 26 of the shaft 18. The tube 28 has an inner diameter greater than an outer diameter of the shaft 18 to define an interior space of the receptacle 30. The free end 20 of the shaft 18 typically extends outwardly through an opening of the receptacle 30.

The receptacle 30 removably receives a plurality of weighted members 32, wherein the magnetic force opposes a gravitational force of the receptacle 30 and weighted members 32 such that the receptacle 30 is configured to move upwardly along the shaft 18 when the receptacle 30 receives the weighted members 32. Each of the weight members 32 may be a pellet comprising a nonmagnetic material such as bismuth, tungsten, or gold, wherein the weighted members 32 facilitate incrementally inserting into the receptacle 30.

A plurality of graduation markings 34 is positioned on a panel 36 extending upwardly from the top surface 16 of the base 12 and are configured to facilitate measuring a varied distance between the shaft magnet 24 and the base magnet 14. The graduation markings 34 are sequential and increasing in value moving away from the top surface 16. The graduation markings 34 are evenly spaced along the panel 36 and positioned adjacent to the shaft 18. A pointer 38 extends from the shaft magnet 24 to overlap the graduation markings 34 wherein a position of the shaft magnet 24 along the shaft 18 is indicated by a position of the pointer 38 along the graduation markings 34.

In another embodiment, a bumper 40 may be coupled to the shaft and positioned between the shaft magnet 24 and the base magnet 14. The shaft magnet 24 may rest upon the bumper 40 when the receptacle 30 does not receive the weighted members 32. The bumper 40 may also inhibit the shaft magnet 24 from abutting against the base magnet 14 when the receptacle 30 receives enough of the weighted members 32 to push the receptacle 30 downwardly towards the base 12.

In use, an initial mass of the shaft magnet 24 is measured. An initial distance between the shaft magnet 24 and the base magnet 14 is recorded. A weighted mass of the portion of the plurality of weighted members 32 is measured prior to inserting the portion of the weighted members 32 to the receptacle 30 such that the weighted members 32 are configured to move the shaft magnet 24 upwardly along the center longitudinal axis 26 of the shaft 18. The varied distance between the base magnet 14 and the shaft magnet 24 having the portion of the weighted members 32 is recorded thereafter.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A magnetic displacement measuring assembly comprising:
   a base;
   a base magnet being mounted to a top surface said base;
   a shaft having a free end and a base end coupled to said top surface of said base;
   a shaft magnet being mounted to said shaft and being moveable along said shaft, said shaft magnet is configured to repel away from said base magnet by a magnetic force;
   a tube being coupled to and extending upwardly from said shaft magnet such that said tube and said shaft magnet define a receptacle; and
   a plurality of weighted members, said receptacle removably receiving said weighted members, wherein the magnetic force opposes a gravitational force of the receptacle and weighted members such that said receptacle is configured to move upwardly along said shaft when said receptacle receives said weighted members; and
   a plurality of graduation markings being positioned on a panel extending upwardly from said top surface of the base.

2. The magnetic displacement measuring assembly of claim 1, wherein said base end being positioned in and extending upwardly from a hole in said base magnet.

3. The magnetic displacement measuring assembly of claim 1, wherein said shaft magnet being disc-shaped such that said shaft being positioned within an aperture of said shaft magnet.

4. The magnetic displacement measuring assembly of claim 3, wherein said tube having a central longitudinal axis aligned with said center longitudinal axis of said shaft, said tube having an inner diameter greater than an outer diameter of said shaft to define an interior space of the receptacle.

5. The magnetic displacement measuring assembly of claim 1, wherein said graduation markings are sequential and increasing in value moving away from said top surface, said graduation markings being evenly spaced along said panel and positioned adjacent to said shaft.

6. The magnetic displacement measuring assembly of claim 1, further including a pointer extending from said shaft magnet to overlap said graduation markings wherein a position of said shaft magnet along said shaft is indicated by a position of said pointer along said graduation markings.

7. A magnetic displacement measuring assembly comprising:
- a base;
- a base magnet being mounted to a top surface said base;
- a shaft having a free end and a base end coupled to said top surface of said base, said base end being positioned in and extending upwardly from a hole in said base magnet;
- a shaft magnet being mounted to said shaft and being moveable along said shaft, said shaft magnet is configured to repel away from said base magnet by a magnetic force, said shaft magnet being disc-shaped such that said shaft being positioned within an aperture of said shaft magnet;
- a tube being coupled to and extending upwardly from said shaft magnet such that said tube and said shaft magnet defining a receptacle, said tube having a central longitudinal axis aligned with a center longitudinal axis of said shaft, said tube having an inner diameter greater than an outer diameter of said shaft to define an interior space of the receptacle;
- a plurality of weighted members, said receptacle removably receiving said weighted members, wherein the magnetic force opposes a gravitational force of the receptacle and weighted members such that said receptacle is configured to move upwardly along said shaft when said receptacle receives said weighted members;
- a plurality of graduation markings being positioned on a panel extending upwardly from said top surface of the base, said graduation markings being sequential and increasing in value moving away from said top surface, said graduation markings being evenly spaced along said panel and positioned adjacent to said shaft; and
- a pointer extending from said shaft magnet to overlap said graduation markings wherein a position of said shaft magnet along said shaft is indicated by a position of said pointer along said graduation markings.

8. A method for measuring a change in a magnetic field with respect to the inverse square law comprising the steps of:
- measuring an initial mass of a shaft magnet, said shaft magnet having a tube coupled thereto to define a receptacle;
- mounting said shaft magnet to a shaft extending upwardly from a base, a base magnet being mounted to said base, wherein said base magnet is configured to repel said shaft magnet by a magnetic force;
- recording an initial distance between said shaft magnet and said base magnet;
- measuring a weighted mass of a portion of a plurality of weighted members;
- inserting said portion of said weighted members to said receptacle such that said weighted members are configured to move said shaft magnet upwardly along a center longitudinal axis of said shaft; and
- recording a varied distance between said base magnet and said shaft magnet having said portion of said weighted members.

\* \* \* \* \*